United States Patent
Wallace et al.

(10) Patent No.: US 6,282,880 B1
(45) Date of Patent: Sep. 4, 2001

(54) METHOD OF UTILIZING PURGE GAS FROM AMMONIA SYNTHESIS

(75) Inventors: Paul S. Wallace, Katy; Kay Anderson Johnson, Missouri City, both of TX (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/497,588

(22) Filed: Feb. 3, 2000

Related U.S. Application Data

(60) Provisional application No. 60/118,470, filed on Feb. 3, 1999.

(51) Int. Cl.⁷ ......................................................... F02C 3/20
(52) U.S. Cl. ........................ 60/39.02; 60/39.12; 423/237
(58) Field of Search ........................... 60/39.02, 39.12; 423/237, 238, 239.1, 239.2

(56) References Cited

U.S. PATENT DOCUMENTS

| | | |
|---|---|---|
| 4,099,382 | 7/1978 | Paull et al. . |
| 4,178,758 | 12/1979 | Paull et al. . |
| 4,180,552 * | 12/1979 | Graham et al. ................ 423/359 |
| 4,566,267 | 1/1986 | Muller et al. . |
| 5,345,756 | 9/1994 | Jahnke et al. . |
| 5,472,986 | 12/1995 | Van Dijk . |
| 5,846,507 | 12/1998 | Liu et al. . |

FOREIGN PATENT DOCUMENTS

| | | |
|---|---|---|
| 0212889 | 3/1987 | (EP) . |
| 0682977 | 11/1995 | (EP) . |
| 0770576 | 5/1997 | (EP) . |
| 2017071 | 9/1979 | (GB) . |
| 97/33828 | 9/1997 | (WO) . |

* cited by examiner

Primary Examiner—Michael Koczo
(74) Attorney, Agent, or Firm—Morris N. Reinisch; Howrey Simon Arnold & White

(57) ABSTRACT

The invention provides an improved ammonium synthesis process. A synthesis gas is separated with a membrane into a hydrogen-rich gas and a hydrogen-depleted gas. The hydrogen rich gas is shifted with steam to convert carbon monoxide to carbon dioxide and hydrogen. Carbon dioxide is removed from the shifted gas, and remaining carbon oxides are methanized. This gas is admixed with nitrogen and with recycled ammonia synthesis feedstock gas. This ammonia synthesis feedstock gas is then cycled in an ammonia synthesis reactor. A purge gas stream is withdrawn from the ammonia synthesis feedstock gas and is admixed with the hydrogen-depleted gas. The hydrogen-depleted gas and the purge gas are combusted, usually in a combustion turbine, to generate heat or power. Lower purity hydrogen can therefore be used in the synthesis of the ammonia.

9 Claims, 1 Drawing Sheet

METHOD OF UTILIZING PURGE GAS FROM AMMONIA SYNTHESIS

Priority of U.S. Provisional Application No. 60/118,470, filed Feb. 3, 1999 is claimed.

BACKGROUND OF THE INVENTION

BACKGROUND

The reaction of nitrogen and hydrogen to provide ammonia by the "Hall Process" is well known art with the commercial production of ammonia being developed in the early 1900s. Ammonia is produced by the direct reaction of hydrogen gas and nitrogen gas over an iron based catalytic surface.

$$3H_2 + N_2 \leftrightarrows 2NH_3$$

The synthesis reaction is reversible and the thermodynamic equilibrium does not favor ammonia production. The overall conversion is low, thus ammonia synthesis is characterized by the recycle of the ammonia synthesis feedstock gas through a reactor, and withdrawing the product from the resulting gas between each recycle. Based on Le Chatelier's principle, an increase in pressure favors ammonia production and a higher temperatures increase reaction rates but in the latter case the equilibrium concentration of ammonia in the product gas decreases with increasing temperature. In addition, high reaction temperatures increase the degradation of the catalyst. The space velocity, or the ratio of the flux rate of gas at standard conditions per volume of catalyst, is generally between about 8,000 and 60,000 volumes per volume per hour. The space velocity for the ammonia synthesis reaction is generally not critical.

The iron based ammonia synthesis catalysts are known to be poisoned by carbon oxides and oxygen in any form. The use of expensive copper liquid scrubbing processes were developed for removal of such carbon oxides from the ammonia synthesis feedstock gas. A shift conversion of carbon dioxide to methane has also been developed.

Generally, the commercial synthesis of ammonia consists of three steps. First the ammonia synthesis feedstock gas is prepared. This involves generation of hydrogen gas, the introduction of nitrogen in the stoichiometric synthesis proportion, and the removal of impurities and catalysts poisons. Catalyst poisons are mainly carbon dioxide and carbon monoxide, though sulfur will also poison the catalyst. Historically, the carbon monoxide in the gas is converted to hydrogen and carbon dioxide by reaction with steam over catalyst. Carbon dioxide can be removed by water scrubbing. Then the ammonia synthesis feedstock gas is passed through the ammonia synthesis reactor. The ammonia is removed by scrubbing the exiting gas with water and the unreacted ammonia synthesis feedstock gas is recycled as the last step.

The low conversion and resulting need to recycle ammonia synthesis feedstock gas results in a buildup of inert impurities, primarily argon and methane. Thus a purge gas stream must be withdrawn to prevent buildup of these inert impurities in the recycled gas. This purge gas stream has little value, and is often flared. In order to avoid the economic and environmental cost of flaring, ammonia manufacturers have emphasized the use of high purity ammonia synthesis feedstock gas.

Gasification has been used to generate hydrogen gas and fuel gas (also known as synthesis gas or "syn-gas") from hydrocarbon streams such as coal, petroleum coke, residual oil, and other materials for years. The hydrocarbon is gasified in the presence of oxygen which is usually generated by an air separation plant in which nitrogen is removed from the air to form the purified oxygen. The availability of nitrogen and hydrogen have led to the use of gasification as a feedstock preparation unit for ammonia synthesis. Synthesis gas from gasification has also been used as a fuel to combustion turbines.

The production of synthesis gas from the solid and liquid carbonaceous fuels, especially coal, coke, and liquid hydrocarbon feeds, has been utilized for a considerable period of time and has recently undergone significant improvements due to the increased energy demand and the need for clean utilization of otherwise low value carbonaceous material. Synthesis gas may be produced by heating carbonaceous fuels with reactive gases, such as air or oxygen, often in the presence of steam or water in a gasification reactor to obtain the synthesis gas which is withdrawn from the gasification reactor.

The synthesis gas may be then further treated often by separation to form a purified hydrogen gas stream. The synthesis gas stream can be processed to obtain a hydrogen gas stream of greater than 99.9 mole percent purity. By product nitrogen gas may be taken from the oxygen plant, purified, and then introduced to the hydrogen gas to create the ammonia synthesis feedstock gas.

In spite of these developments, what is needed in the industry is an effective method of utilizing the purge gas stream from the ammonia synthesis reactor so that the tolerances on the purity of the ammonia synthesis feedstock gas purity limitations can be relaxed.

SUMMARY OF THE INVENTION

Hydrocarbonaceous materials are gasified to create a synthesis gas. The synthesis gas is cooled and treated to remove sulfur. The synthesis gas is separated with a gas separation membrane into a hydrogen-rich gas and a hydrogen-depleted gas. The hydrogen-rich gas is shifted with steam by way of the Water-Gas shift reaction to convert carbon monoxide to carbon dioxide and hydrogen. Carbon dioxide is removed from the shifted gas by scrubbing and the remaining carbon oxides are methanized. The resulting hydrogen rich gas is admixed with nitrogen and with recycled ammonia synthesis feedstock gas, thereby creating a larger volume of ammonia synthesis feedstock gas. This ammonia synthesis feedstock gas is then passed over an ammonia synthesis catalyst. The ammonia is recovered from the resulting product gas, and the remaining portion of the ammonia synthesis feedstock gas is recycled. A purge gas stream is withdrawn from the recycled ammonia synthesis feedstock gas and is admixed with the hydrogen-depleted gas. The hydrogen-depleted gas and the purge gas are combusted, usually in a combustion turbine, to generate heat or power.

The above scheme permits the use of lower purity hydrogen in the synthesis of ammonia. The reduction in purity reduces the cost of generating the hydrogen. Further the above system reduces or eliminates the use of a Pressure Swing Absorption reactor for generating high purity hydrogen. As a result of the present invention, less costly purification methods such as membranes and methanation can be used.

These and other features of the present invention are more fully set forth in the following description of illustrative embodiments of the invention.

BRIEF DESCRIPTION OF THE DRAWINGS

The following description is presented with reference to the accompanying drawings in which.

DESCRIPTION OF ILLUSTRATIVE EMBODIMENTS

Figure 1:
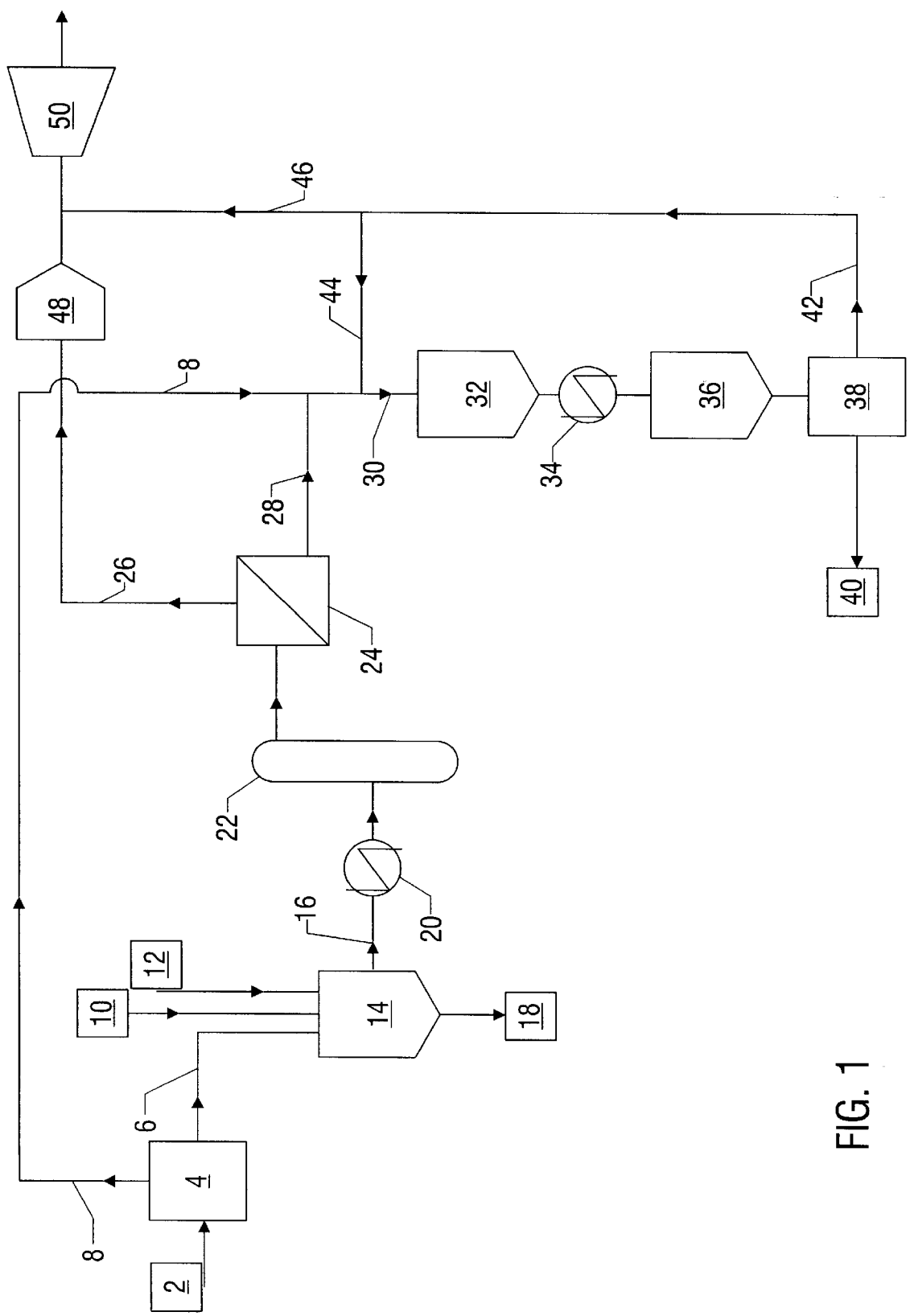
FIG. 1 is a schematic of one illustrative embodiment of the present invention.

Hydrocarbonaceous materials may be gasified to create a mixture of hydrogen, carbon monoxide and carbon dioxide also known as synthesis gas. The gasification and subsequent combustion of certain hydrocarbonaceous materials provides a environmentally friendly method of generating power and needed chemicals from these otherwise environmentally unfriendly feedstocks. The term "hydrocarbonaceous" as used herein to describe various suitable feedstocks is intended to include gaseous, liquid, and solid hydrocarbons, carbonaceous materials, and mixtures thereof. In fact, substantially any combustible carbon-containing organic material, or slurries thereof, may be included within the definition of the term "hydrocarbonaceous". Solid, gaseous, and liquid feeds may be mixed and used simultaneously; and these may include paraffinic, olefinic, acetylenic, naphthenic, and aromatic compounds in any proportion. Also included within the definition of the term "hydrocarbonaceous" are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof. Coal, petroleum based feedstocks including petroleum coke and other carbonaceous materials, waste hydrocarbons, residual oils and byproducts from heavy crude oil are commonly used for gasification reactions.

The hydrocarbonaceous fuels are reacted with a reactive oxygen-containing gas, such as air, substantially pure oxygen having greater than about 90 mole percent oxygen, or oxygen enriched air having greater than about 21 mole percent oxygen. Substantially pure oxygen is preferred. To obtain substantially preferred oxygen, air is compressed and then separated into substantially pure oxygen and substantially pure nitrogen in an oxygen plant. Such oxygen plants are known in the industry.

Synthesis gas can be manufactured by any partial oxidation method. Preferably, the gasification process utilizes substantially pure oxygen with above about 95 mole percent oxygen. The gasification processes are known to the art. See, for example, U.S. Pat. Nos. 4,099,382 and 4,178,758, the disclosures of which are incorporated herein by reference.

In the gasification reactor, the hydrocarbonaceous fuel is reacted with a free-oxygen containing gas, optionally in the presence of a temperature moderator, such as steam, to produce synthesis gas. In the reaction zone, the contents will commonly reach temperatures in the range of about 900° C. to 1700° C., and more typically in the range of about 1100° C. to about 1500° C. Pressure will typically be in the range of about 1 atmosphere (101 kPa) to about 250 atmospheres (25,250 kPa), and more typically in the range of about 15 atmospheres (1,515 kPa) to about 150 atmospheres (15,150 kPa), and even more typically in the range of about 800 psi (5,515 kPa) to about 2000 psi (13,788 kPa) (where: 1 atmosphere=101.325 kPa and 1 psi=6.894 kPa).

The synthesis gas is cooled and treated to remove sulfur. The cooling may be accompanied by heat recovery, often in the form of high and low pressure steam generation, but also beneficially by heat extraction using heat exchangers wherein low level heat is used to preheat reactants, or to vaporize nitrogen from the oxygen plant.

Synthesis gas predominately includes carbon monoxide gas and hydrogen gas. Other materials often found in the synthesis gas include hydrogen sulfide, carbon dioxide, ammonia, hydrocarbons, cyanides, and particulates in the form of carbon and trace metals. The extent of the contaminants in the feed is determined by the type of feed, the particular gasification process utilized and the operating conditions.

As the synthesis gas is discharged from the gasifier, it is usually subjected to a cooling and cleaning operation involving a scrubbing technique wherein the gas is introduced into a scrubber and contacted with a water spray which cools the gas and removes particulates and ionic constituents from the synthesis gas. The cooling may be accompanied by heat recovery in the form of high and low pressure steam generation, but also beneficially by heat extraction using heat exchangers wherein low level heat is used to preheat reactants, or to vaporize nitrogen from the oxygen plant.

The initially cooled gas may then be treated to desulfurize the gas prior to utilization of the synthesis gas. Sulfur compounds and acid gases can be readily removed. Conventional amine solvents, such as MDEA, can be used to remove the most common acid gas, hydrogen sulfide, but also other acid gases. The fluids may be solvents such as lower monohydric alcohols, such as methanol, or polyhydric alcohols such as ethylene glycol and the like. The fluid may contain an amine such as diethanolamine, methanol, N-methyl-pyrrolidone, or a dimethyl ether of polyethylene glycol. Physical solvents such as SELEXOL and RECTIXOL may also be used. The physical solvents are typically used because they operate better at high pressure. The synthesis gas is contacted with the solvent in an acid gas removal contactor which may be of any type known to the art, including trays or a packed column. Operation of such an acid removal contactor is known in the art.

The synthesis gas may beneficially be subjected to the water-gas shift reaction in the presence of steam (i.e. steam shifted) to increase the fraction of hydrogen. In one embodiment, the synthesis gas is steam shifted to increase the fraction of hydrogen prior to separation, then a hydrogen-rich fraction of the synthesis gas is separated from the shifted synthesis gas. In another embodiment, a hydrogen-rich fraction of the synthesis gas is steam shifted after it is separated from the hydrogen-depleted portion of the synthesis gas. In yet another embodiment, the synthesis gas is steam shifted to increase the fraction of hydrogen prior to separation, then a hydrogen-rich fraction of the synthesis gas is separated, and then the separated hydrogen-rich fraction is steam shifted a second time to increase the fraction of hydrogen.

The synthesis gas can be separated with a gas separation membrane into a hydrogen-rich gas and a hydrogen-depleted gas. A gas separation membrane system allows small molecules like hydrogen to selectively pass through the membrane (permeate) while the larger molecules ($CO_2$, CO) do not pass through the membrane (no-permeate). Gas separation membranes are a cost effective alternative to a pressure swing absorption unit. The gas separation membranes reduce the pressure of the product hydrogen so that the hydrogen rich fraction has to be compressed prior to use.

The gas separation membrane can be of any type which is preferential for permeation of hydrogen gas over carbon dioxide and carbon monoxide. Many types of membrane materials are known in the art which are highly preferential for diffusion of hydrogen compared to nitrogen, carbon monoxide and carbon dioxide. Such membrane materials include: silicon rubber, butyl rubber, polycarbonate, poly (phenylene oxide), nylon 6,6, polystyrenes, polysulfones, polyamides, polyimides, polyethers, polyarylene oxides, polyurethanes, polyesters, and the like. The gas separation membrane units may be of any conventional construction, and a hollow fiber type construction is preferred.

The gas separation membranes cause a reduction in the pressure of the hydrogen-enriched stream so it has to be compressed prior to use. The synthesis gas or mixed gas stream enters the membrane at high pressure, typically between about 800 psi (5,515 kPa) and about 1600 psi (11,030 kPa), more typically between about 800 psi (5,515 kPa) and about 1200 psi (8,273 kPa). The gas temperature is typically between about 10° C. to about 100° C., more typically between about 20° C. and about 50° C. The gas separation membrane allows small molecules like hydrogen to pass through (permeate) while the larger molecule ($CO_2$, CO) do not pass through (non-permeate). The permeate experiences a substantial pressure drop of between about 500 psi (3,447 kPa) to about 700 psi (4,826 kPa) as it passes through the membrane. The hydrogen-rich permeate is therefore typically at a pressure of from about 100 psi (689 kPa) to about 700 psi (4826 kPa), more typically between about 300 psi (2,068 kPa) to about 600 psi (4,136 kPa).

The hydrogen rich permeate may contain between about 50 to about 98 mole percent hydrogen gas. If the synthesis gas was steam shifted prior to the membrane separation, than the hydrogen content of the permeate, also called the hydrogen-rich synthesis gas, will be at the upper end of this range. If the synthesis gas was not shifted prior to separation, then the hydrogen content of the hydrogen rich permeate will be at the lower end of this range. A typical hydrogen rich permeate composition will be 60 mole percent hydrogen, 20 mole percent carbon monoxide, and 20 mole percent carbon dioxide, plus or minus about 10 mole percent for each component.

The non-permeate has negligible pressure drop in the membrane unit. The non-permeate gas stream from the membrane mostly includes carbon dioxide, carbon monoxide, and some hydrogen. Other compounds, in particular volatile hydrocarbons and inerts, may also be present. It has been found that this non-permeate makes a good fuel for combustion turbines. The pressure of this permeate may be advantageously reduced in a turbo-expander to generate electricity or provide energy to compressors prior to burning in a combustion turbine.

The hydrogen rich permeate may need to be compressed to be used in, for example, a high pressure ammonia reactor. Such compression can be done at any time. An expander/compressor may be used to simultaneously increase the hydrogen pressure and to reduce the non-permeate gas pressure.

The hydrogen-rich gas may be then advantageously shifted with steam to convert carbon monoxide to carbon dioxide and hydrogen by way of the water gas shift reaction. One advantage of doing this is the removal of carbon monoxide which is a poison to the ammonia promoting catalyst. The synthesis gas from the gasifier is shifted using steam and a suitable catalyst to form hydrogen as shown below.

$$H_2O + CO \rightarrow H_2 + CO_2$$

The shift process, also called a water gas shift process or steam reforming, converts water and carbon monoxide to hydrogen and carbon dioxide. The shift process is described in, for example, U.S. Pat. No. 5,472,986, the disclosure of which is incorporated herein by reference. Steam reforming is a process of adding water, or using water contained in the gas, and reacting the resulting gas mixture adiabatically over a steam reforming catalyst. The advantages of steam reforming are both an increase the amount of hydrogen and a reduction in the carbon monoxide in the gas mixture.

The steam reforming catalyst can be one or more Group VIII metals on a heat resistant support. Conventional random packed ceramic supported catalyst pieces, as used for example in secondary reformers, can be used but, since these apply a significant pressure drop to the gas, it is often advantageous to use a monolithic catalyst having through-passages generally parallel to the direction of reactants flow.

The shift reaction is reversible, and lower temperatures favor hydrogen and carbon dioxide. However, the reaction rate is slow at low temperatures. Therefore, it is often advantageous to have high temperature and low temperature shift reactions in sequence. The gas temperature in a high temperature shift reaction typically is in the range 350° C. to 1050° C. High temperature catalysts are often iron oxide combined with lesser amounts of chromium oxide. A preferred shift reaction is a sour shift, where there is almost no methane and the shift reaction is exothermic. Low temperature shift reactors have gas temperatures in the range of about 150° C. to 300° C., more typically between about 200° C. to 250° C. Low temperature shift catalysts are typically copper oxides that may be supported on zinc oxide and alumina. Steam shifting often is accompanied by efficient heat utilization using, for example, product/reactant heat exchangers or steam generators. Such shift reactors are known to the art.

It is preferred that the design and operation of the shift reactor result in a minimum of pressure drop. The pressure of the synthesis gas is therefore preserved.

The effluent from the shift reactor or reactors may contain 4 to 50 mole percent carbon dioxide and thus needs to be reduced. The carbon dioxide may be removed from the synthesis gas by contacting the synthesis gas with a suitable solvent in an acid gas removal contactor. Such a contactor may be of any type known to the art, including trays or a packed column. Operation of such an acid removal contactor is known in the art.

The type of fluid that reacts with the acid gas is not important. Thus the carbon dioxide removal step, the so-called "chemical" solvents can be used, such as ethanolamines or potassium carbonate, especially in the established processes such as "Amine Guard", "Benfield", "Benfield-DEA", "Vetrocoke" and "Catacarb", at any of the pressures contemplated for the process of the process of the invention. As examples of physical solvents there may be mentioned: tetramethylene sulfone ("Sulfinor"); propylene carbonate ("Fluor"); N-methyl-2-pyrrolidone ("Purisol"); polyethyleneglycol dimethyl ether ("Selexol"); and methanol ("Rectisol"). Water can also be used, especially if there is pH control of the water. One such method is a carbonate-based water system wherein carbonates such as potassium carbonate in the water lowers the pH. This low pH water absorbs carbon dioxide to form bicarbonate salts. Later, heating this water liberates carbon dioxide and regenerates the potassium carbonate.

The above noted physical solvents are typically used because they operate better at high pressure. For effective use of physical solvents the process pressure is preferably at least 20 bars (2,000 kPa) (1 bar=100 kPa)

The synthesis gas is contacted with the solvent in an acid gas removal contactor. Said contactor may be of any type known to the art, including trays or a packed column. Operation of such an acid removal contactor is known in the art.

Under the present invention, lower purity hydrogen can be used in the synthesis of the ammonia. The reduction in purity reduces the cost of generating the hydrogen. Further the use of Pressure Swing Absorption units to generate high purity hydrogen gas is no longer required. Less costly purification methods such as membranes and methanation can be used.

Because the synthesis gas is to be methanated, a high purge rate is possible using this invention. The exiting gas may contain between about 0.01 to about 5 percent, preferably between about 0.05 and about 3 percent, more preferably between about 0.1 and about 1 percent, of carbon dioxide. This range is much lower purity than is typically encountered in ammonia plants.

Any remaining carbon oxides may be methanized. Methanation reactions combine hydrogen with residual carbon oxides to form methane and water. These reactions are strongly exothermic and the heat generated from such reactions may be captured and used to generate steam if desired. The catalyst for the methanation is typically nickel supported on a refractory substance such as alumina although other suitable catalysts may be used. The methanation step reduces the carbon oxides to below about 20 ppm, preferably below about 5 ppm. Such methanation reactions are known in the art.

The hydrogen resulting from the above described process has a purity of between 96 and about 99.99, more typically between about 99% and 99.9%. This gas may be admixed with nitrogen and with recycled ammonia synthesis feedstock gas, thereby creating a larger volume of ammonia synthesis feedstock gas. This gas mixture is compressed and used in the synthesis of ammonia. The resulting ammonia synthesis feedstock gas contains the hydrogen and nitrogen reactants in the molar ratio of between about 2.7:1 to about 3.2:1, preferably between about 2.8:1 to about 3.1:1, and more preferably between about 2.9:1 to about 3.0:1. Inerts are present in the range of between about 2 and about 30 mole percent, more typically in the range of about 10 to about 20 mole percent. In one embodiment, the inerts are present at about 15 mole percent, plus or minus about 2 mole percent. The inerts are principally argon and methane, though other compounds including ethane may be present. Prior to the present invention, such levels of inerts may not be acceptable for conventional ammonia synthesis. However, because of the increased purge gas removal rates, build up of excessive inert concentrations in the ammonia synthesis feedstock gas up is not a problem.

Typically in conventional ammonia plants pressures of between about 2000 psi and about 5000 psi are used. In this embodiment pressures of between about 600 psi and about 5000 psi can be used. A preferred range is between about 800 psi and about 2000 psi. An even more preferred range is between about 900 psi and about 1500 psi.

This ammonia synthesis feedstock gas is passed over the ammonia synthesis catalyst. This is often called a synthesis loop because of the recycle of the ammonia synthesis gas. The temperature of the ammonia synthesis gas is near ambient. The catalyst can be contained in one or more tubular or bed reactors and these reactors may be set-up in series of one or more reactors. In such cases there may be provisions for cooling the gas between ammonia synthesis reactors.

The ammonia synthesis catalyst may be any type known in the industry for the synthesis of ammonia. An example is described in U.S. Pat. No. 5,846,507, the disclosure of which is incorporated herein.

The ammonia is recovered from the product gas, and a portion of the remaining ammonia synthesis feedstock gas is recycled. Recovery of the ammonia is generally by condensation, though any method known to the art, including water or solvent scrubbing, is practicable. Condensation may be assisted by expanding the gas, or by cooling with liquid nitrogen from the oxygen plant.

The resulting ammonia depleted product gas is then compressed and most of the ammonia depleted product gas is recycled as ammonia synthesis feedstock gas. The order of compression, admixing the hydrogen-rich permeate and the nitrogen, and ammonia recovery is not important.

A purge gas stream is withdrawn from the ammonia synthesis feedstock gas and is admixed with the hydrogen-depleted gas generated by the gas separation membrane unit. The purge gas stream is taken as a side stream and serves to remove the inert impurities that build up in the system. Traditionally the purge gas was be recompressed or burned (flared). This is costly and inefficient. Therefore, prior to the present invention every effort was made to reduce the volume of the purge gas stream. One way to reduce the volume of the purge gas was to reduce the impurities that enter the process with the feeds. In order to achieve this, however, very high purity hydrogen (>99.9%) was required.

In contrast, in the method of the present invention the purge gas stream may be admixed with a synthesis gas stream, thereby creating a mixed gas stream. Alternatively, the purge gas may be admixed with the hydrogen-depleted synthesis gas resulting from the gas separation membrane unit. Compression of the purge gas is often not required, as the ammonia plant operates at about the same or at a higher pressure than the synthesis gas is generated.

Thus in one embodiment in which gasification takes place, the purge gas can be mixed with the raw synthesis gas coming from the gasification unit. The impurities in the synthesis gas/purge gas combined gas stream can be removed by the synthesis gas acid gas removal system. After passing through the gas separation membrane unit, the combined gases can be routed to a combustion turbine along with the CO, $CO_2$, and other components of the hydrogen-depleted gas that are removed from the synthesis gas to form hydrogen as previously disclosed. With a cost effective disposition for the purge gas, the quantity of purge gas generated is no longer an important design issue.

The purge gas stream can range from about 0.1 percent to about 10 percent, preferably between about 1 and about 3 percent, of the ammonia synthesis feedstock gas stream.

The combined hydrogen-depleted gas and the purge gas may be combusted, usually in a combustion turbine, to generate heat or power. The non-permeate gas stream from the membrane contains carbon dioxide, carbon monoxide, and some hydrogen. Other compounds, in particular volatile hydrocarbons, may also be present. This non-permeate makes a good fuel for combustion turbines. The quality of this fuel gas is not adversely affected by the addition of the purge gas, and valuable power generation can be achieved from the combustion of this purge gas in a combustion turbine. The combustion turbine adds air and combusts the mixture, and then the exhaust gases are expanded thorough a turbine. Such combustion turbines are known to the art.

Alternatively, the hydrogen-depleted gas and the purge gas may be combined and then combusted to create heat or power preferably in a combustion turbine. The combustion turbine adds air and combusts the mixture, and then the exhaust gases are expanded thorough a turbine. Such combustion turbines are known to the art.

Most gas combustion turbines have lower limits on the amount of heating value per cubic foot of fuel gas. For general use the fuel with the highest heating value is methane, which has, a fuel values of around 900 to 1000 BTU/scf. Other gaseous fuels may have less heating value, down to 300 to 500 BTU/scf, and these can be treated in a somewhat similar manner as natural gas. When, however, the heating value falls below this level of about 300 BTU/scf, a rigorous inspection of gas turbine conditions is called for, this to avoid feeding too much inert material to the expander side.

If the fuel gas has a heating value below about 100 BTU/scf, other problems arise. At this low value it becomes necessary to determine if the fuel gas can be completely burned in the residence time in the burner or burners of the gas turbine before entering the expander proper. Incomplete combustion can easily lead to deposition of carbonaceous material on the expander blades, which will lead to an early demise of the gas turbine involved. Thus it is essential that the heating value of the tail gas fuel not be too low, preferably it should be at least about 100 BTU/scf. Also, such low BTU/scf fuel gases should have fast burning characteristics. This is especially true when the available burner space of the gas turbine is limited, which in a relatively large number of commercially available gas turbines is indeed the case.

The fastest burning material is hydrogen. A considerable fraction of the heating value of such fuel gas with very low heating value has to be provided by hydrogen. A reasonable fraction is about 30 to 40% as a minimum of the heat of combustion BTU content is supplied by hydrogen. The fast burning hydrogen elevates the temperature of the flame considerably in relatively little space, whereupon the other combustibles of the low heating value fuel have more chance to be burned properly. Especially when hydrogen has been burned already, and the gas temperature has therefore been increased and hot steam has become available, any CO present in the tail gas fuel will then burn with great speed.

Any methane present burns slow. It is essential that the temperature be elevated so that this slow burning species can be totally combusted. It is therefore not attractive to have more than say 30% of total heat of combustion content available as methane in the tail gas fuel.

The addition of the purge gas to the non-permeate gas increases both the fraction of hydrogen and the overall heating value of the gas.

Because the non-permeate pressure is virtually unaffected by the membrane, the pressure of this permeate is advantageously reduced prior to burning in a combustion turbine. Combustion turbines generally operate at about 300 psi feed pressure. The energy from the expansion of this gas can be used, for example, to compress other gas streams or generate electricity.

The utilization of the purge gas in the manner disclosed herein results in considerable economic advantage. It is believed that such advantage can be realized and the quantity of the purge gas is less of an issue than if the purge gas was merely flared. The purge gas stream can range from about 0.1 percent to about 10 percent, preferably between about 1 and about 3 percent, of the ammonia synthesis feedstock gas stream.

A schematic drawing of an illustrative embodiment of the present invention is shown in FIG. 1. Air 2 is feed into an air separation unit 4 which produces an predominately oxygen stream 6 and a predominately nitrogen stream 8. The predominately oxygen stream is utilized as part of the feed stock blend, also including hydrocarbonaeous material 10 and steam or water 12, for the gasifier 14. Partial oxidation occurs within the gasifier resulting in crude synthesis gas 16 and particulate matter 18. The crude synthesis gas is cooled by heat exchanger 20 and then passed through an acid gas scrubber 22. The resulting cooled and acid gas scrubbed synthesis gas is then fed into the gas separation membrane unit 24 in which a hydrogen depleted stream 26 and a hydrogen rich stream 28 is created. The hydrogen rich stream is then combined with the predominately nitrogen stream from the air separation unit and the ammonia synthesis reactor recycle gas 44 to give the ammonia synthesis feed stock gas 30. The ammonia synthesis feedstock gas is then passed through a series of ammonia synthesis reactors 32 and 36 with cooling of the gas between the reactors 34. The resulting product gas is fed into the ammonia separation unit 38 which separates a majority of the ammonia component to give an ammonia product stream 40 and an ammonia synthesis reactor recycle gas 42. A portion of the ammonia synthesis reactor recycle gas returns for further use 44, and a second portion, the purge gas 46 is removed from the recycle loop. The purge gas 46 is then combined with the product of the methanation reactor 48 which is fed by the hydrogen depleted gas stream 26 from the gas separation membrane unit 24, and combusted in a combustion turbine 50.

The above illustrative embodiment is intended to serve a simplified schematic diagram of one potential embodiment of the present invention. One of ordinary skill in the art of chemical engineering should understand and appreciate that specific details of any particular embodiment may be different and will depend upon the location and needs of the system under consideration. All such layouts, schematic alternatives, and embodiments capable of achieving the present invention are considered to be within the capabilities of a person having skill in the art and thus within the scope of the present invention.

While the apparatus, compounds and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. In a method of manufacturing ammonia, said method including: admixing and reacting a substantially pure oxygen stream with hydrocarbonaceous materials, thereby forming a synthesis gas; generating a hydrogen containing gas from the synthesis gas and combining the hydrogen containing gas with nitrogen gas and ammonia synthesis recycle gas to generate an ammonia synthesis feedstock gas; reacting the ammonia synthesis feedstock gas, wherein the reaction is promoted by a catalyst, resulting in ammonia synthesis product gas; recovering ammonia from the ammonia synthesis product gas, and recycling a portion of the ammonia synthesis product gas as recycled ammonia synthesis feedstock gas; and separating a purge gas stream from the ammonia synthesis product gas, wherein the improvement comprises:
   a) separating the synthesis gas with a gas separation membrane into a hydrogen-rich gas and a hydrogen-depleted gas;
   b) utilizing the hydrogen-rich gas as the hydrogen containing gas in the synthesis of ammonia;
   c) combining the hydrogen-depleted gas with the purge gas from the synthesis of ammonia; and
   d) combusting the combination of hydrogen-depleted gas and purge gas in a combustion turbine.

2. The method of claim 1, wherein the gas separation membrane is selected such that the gas separation membrane is preferential for permeation of hydrogen gas over carbon dioxide and carbon monoxide gases.

3. The method of claim 1 wherein the gas separation membrane is comprised of a gas permeable material selected from: silicon rubber, butyl rubber, polycarbonate, poly (phenylene oxide), nylon 6,6, polystyrenes, polysulfones, polyamides, polyimides, polyethers, polyarylene oxides, polyurethanes, polyesters and combinations thereof.

4. The method of claim 1 wherein the combustion turbine is utilized to generate electricity.

5. A process to manufacture ammonia comprising:
   a) admixing and reacting a substantially pure oxygen stream with hydrocarbonaceous materials, thereby forming a synthesis gas;
   b) separating the synthesis gas with a gas separation membrane into a hydrogen-rich gas and a hydrogen-depleted gas;
   c) admixing and reacting the hydrogen-rich gas with steam to form a shifted gas wherein carbon monoxide is converted to carbon dioxide and hydrogen;
   d) removing carbon dioxide from the shifted gas;
   e) methanizing the remaining carbon oxides;
   f) admixing the gas from step (e) with nitrogen and with recycled ammonia synthesis feedstock gas;
   g) reacting the admixed ammonia synthesis feedstock gas, wherein the reaction is promoted by a catalyst, resulting in ammonia synthesis product gas;
   h) recovering ammonia from the ammonia synthesis product gas, and recycling a portion of the ammonia synthesis product gas as recycled ammonia synthesis feedstock gas in step (f);
   i) separating a purge gas stream from the ammonia synthesis product gas and admixing this purge gas with the hydrogen-depleted gas; and
   j) combusting the admixed hydrogen-depleted gas and the purge gas, thereby generating power and heat.

6. The method of claim 5, wherein the gas separation membrane is selected such that the gas separation membrane is preferential for permeation of hydrogen gas over carbon dioxide and carbon monoxide gases.

7. The method of claim 6 wherein the gas separation membrane is comprised of a gas permeable material selected from: silicon rubber, butyl rubber, polycarbonate, poly (phenylene oxide), nylon 6,6, polystyrenes, polysulfones, polyamides, polyimides, polyethers, polyarylene oxides, polyurethanes, polyesters and combinations thereof.

8. The method of claim 5 wherein the generation of power and heat is carried out in a combustion turbine that is utilized to generate electricity.

9. A process of generating power, said process comprising:
   a) providing a purge gas stream from an ammonia synthesis reactor;
   b) admixing the purge gas stream with synthesis gas, wherein the synthesis gas was obtained by partial oxidation of hydrocarbonaceous material; and
   c) combusting the admixed synthesis gas and the purge gas in a combustion turbine.

* * * * *